Oct. 12, 1965   H. W. CRETSINGER   3,211,061
CARVING ATTACHMENT FOR RADIAL ARM SAWS
Filed Sept. 3, 1963   2 Sheets-Sheet 1

INVENTOR.
HIRAM W. CRETSINGER
BY
Dugger Braddock Johnson + Westman
ATTORNEYS

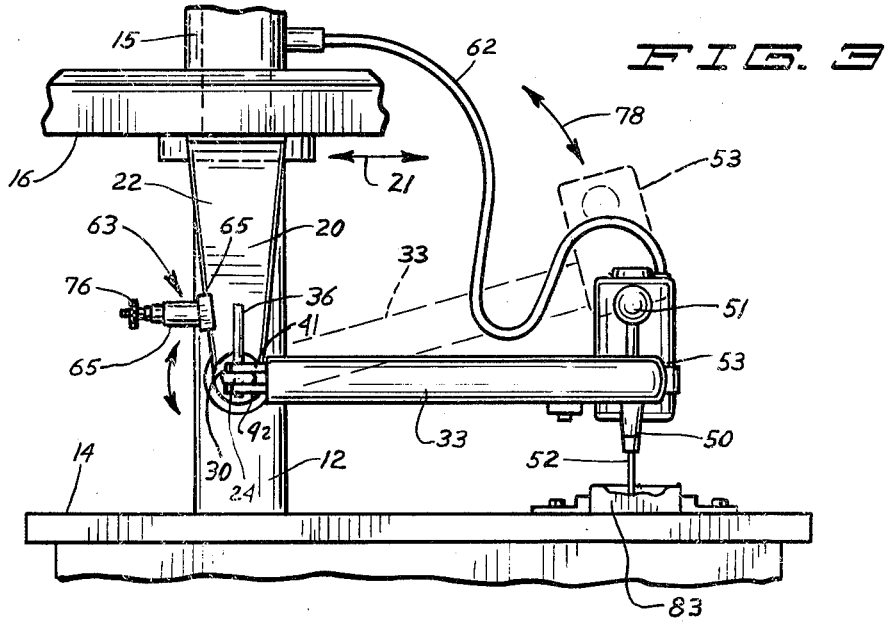
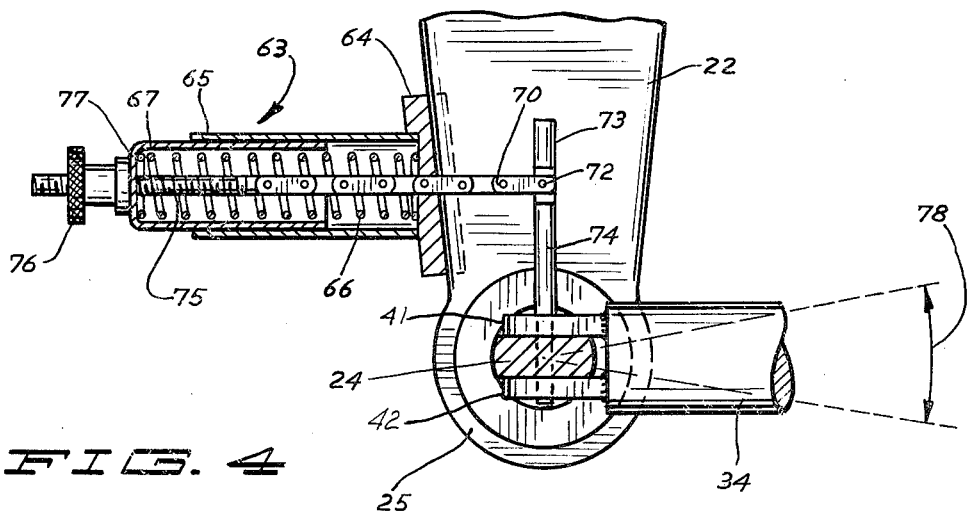

United States Patent Office 3,211,061
Patented Oct. 12, 1965

3,211,061
CARVING ATTACHMENT FOR RADIAL
ARM SAWS
Hiram W. Cretsinger, 1401 S. 1st St., Redfield, S. Dak.
Filed Sept. 3, 1963, Ser. No. 306,148
3 Claims. (Cl. 90—13.1)

The present invention has relation to carving attachments and more particularly to a carving attachment for a radial arm saw which can be used for making carvings from a pattern.

In recent years the home craftsman or hobbyist has been able to obtain more, larger and better woodworking tools. Many of the home woodworking tools approach profession quality and the home craftsman is able to do a wide variety of jobs.

However, the home craftsman has never been able to obtain a carving machine which will duplicate a three dimensional profile from a pattern. The three-dimensional carving machines that are presently available are extremely expensive and complicated to operate.

The present invention in the form as disclosed, presents a carving attachment which will attach onto a radial arm saw, which many home craftsmen presently own, and can be operated to duplicate three-dimensional carvings, moldings, plaques, and other objects from a pattern. The attachment is installed on the motor mounting bracket of the radial arm saw and utilizes the sliding motion of the motor bracket. Further, vertical motion is made possible by pivotally mounting the attachment at the motor bracket and side to side motion is also accomplished by pivoting joints.

The cutting or carving tool utilized is a conventional hand held power router, which is mounted to the unit. A tracer is used for moving along the profile of the pattern to be copied while the router duplicates the movements of the tracer on a separate workpiece.

As shown, two routers are mounted on the unit so that two pieces may be made simultaneously. However, only one router need be used in the average home workshop.

Therefore, by utilizing the basic mounting of a radial arm saw, which is available to many home craftsmen, and modifying the unit to accept a carving attachment, the home craftsman can duplicate intricate wood carvings for a very low cost and with exceptional precision.

It is apparent that the pattern need not be made of wood but can be of any desired material, such as plaster, plastic or other suitable materials. Thus, if the craftsman wishes to he can mold original patterns by known procedures and transform original creative and artistic works into beautiful carved wooden form.

It is an object of the present invention to present a carving attachment which will mount onto radial arm saws and will produce three-dimensional carvings from a pattern.

In the drawings,

FIG. 3 is a fragmentary side elevational view of the device of FIG. 1 taken as on line 3—3 in FIG. 1; and FIG. 4 is a fragmentary enlarged sectional view taken as on line 4—4 in FIG. 2.

Figures 1, 2:
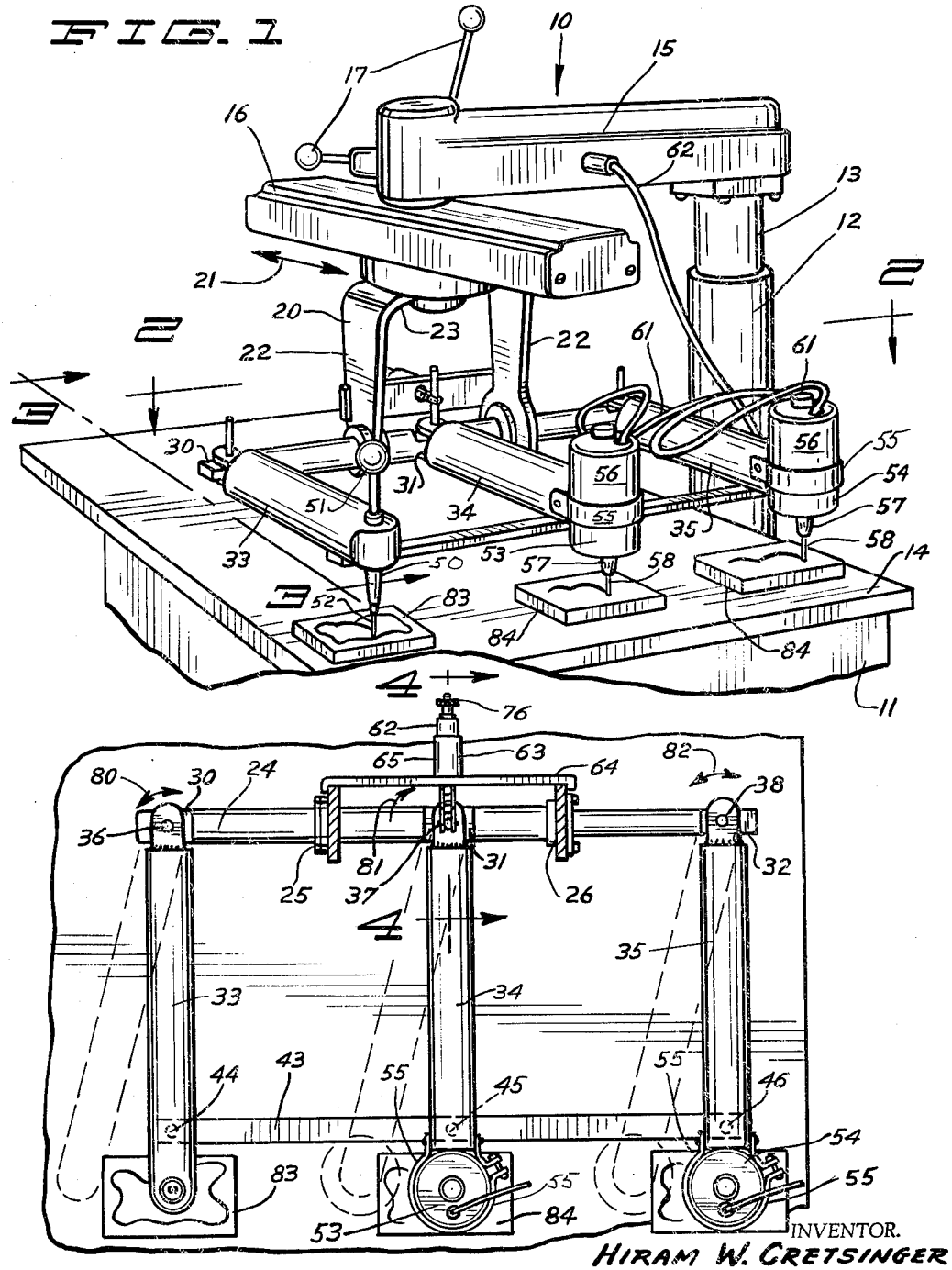
FIG. 1 is a perspective view of a radial arm saw having a carving attachment made according to the present invention installed thereon.
FIG. 2 is a sectional view taken as on line 2—2 in FIG. 1.

Referring to the drawings and the numerals of reference thereon, a radial arm saw illustrated generally at 10 includes a base 11 which has an upright column 12 mounted thereon. The column 12 has a tube 13 slidably mounted therein for vertical movement with respect thereto. The tube 13, in this invention, is fixed at a set height above a work surface table 14. A main mounting arm 15 is fixedly attached to the upper end of tube 13 and extends to overlie the work surface table 14.

In the radial arm saw illustrated in the drawings, a secondary mounting arm 16 is mounted about a substantially vertical axis to the outer end of the main mounting arm 15. The secondary arm 16 is also fixed in position as shown and will not rotate about its axis when the present invention is being utilized. Control levers 17 are mounted on the saw for controlling the various movements thereof.

A motor mounting member or yoke 20 is mounted to secondary arm 16, in the form of the invention illustrated, and is movable in direction as indicated by double arrows 21. On all radial arm saws the motor mounting member or yoke is movable along one of the arms of the saws. In many radial arm saws the motor mounting member is movable along an arm corresponding in position to main mounting arm 15 and movable toward and away from the column 12.

Conventionally the motor for driving the saw blade for the radial arm saw is mounted in the yoke 20. However, in this attachment the motor is removed from the yoke. As can be seen the yoke is comprised as a pair of downwardly depending legs 22, 22 which are mounted on a cross member 23 that is slidable on the secondary arms 16.

The downwardly depending legs have apertures at the bottom thereof which normally mount the motor. However, as shown in FIG. 2, a cross shaft 24 is mounted through the apertures in the leg. The cross shaft 24 is mounted in suitable bushings that can be adapted to fit the motor mountings of the particular yoke used. As shown the shaft is mounted in bushings so that it will pivot about its axis within the yoke. The shaft is held from end to end or axial movement by a stop collar 25 positioned against the first of the legs 22 and a shoulder 26 which may be positioned against an attachment bearing block which can be removably placed onto the second leg 22.

The cross shaft 24 has first, second and third flat portions 30, 31 and 32 thereon. At each of the flat portions there is a tool arm 33, 34 and 35, respectively, pivotally mounted about substantially parallel axes 36, 37 and 38. Each of the arms has a pair of ears 41 and 42 respectively. The ears are positioned on opposite sides of their respective flat spots. A separate pin passes through the ears of each tool arm and the shaft 24. The first, second and third arms 33, 34 and 35 extend outwardly from cross shaft 24 and are parallel to each other. Adjacent the outer end of the tool arms 33, 34 and 35 there is an outer cross bar 43 which is pivotally mounted as at 44 to first arm 33. The cross bar 43 is also pivotally mounted as at 45 to arm 34 and as at 46 to arm 35. Cross bar 43, tool arms 33, 34 and 35 and cross shaft 24 form a parallelogram linkage. The tool arms 33, 34 and 35 will always be parallel to each other regardless of the movement of the arms about their respective axes.

A tracing needle or stylus 50 is mounted at the outer end of first arm 33 and is positioned outwardly from the cross bar 43. The tracing needle has a hand knob 51 at an upper end thereof. The needle 50 extends through tool arm 33 and has a point 52 positioned below the arm. Second arm 34 and third arm 35 each have a power operated router 53 and 54, respectively, mounted to the outer ends thereof. The routers are held in place with attachment bands 55. Bands 55 are adjustable so that different size routers can be used.

The routers 53 and 54 are identical in construction and comprise electric motors mounted in housings 56, 56 and have driven output shafts 57, 57 which in turn mount and drive routing bits illustrated at 58. The motors in housing 56 are powered through electric cords 61, 61 which can be plugged into a main cord 62 leading from a power outlet on the main mounting arm 15.

The weight of the routers and the first, second and third arms 33, 34 and 35 is counter balanced through a spring arrangement illustrated generally at 63. The spring arrangement comprises a base member 64 which is connected between the legs 22, 22 of yoke 20. A tubular housing 65 is mounted onto the base member 64. A spring 66 is mounted within the housing 65 and abuts against base member 64. A cap 67 is mounted over the outwardly extending end of spring 66 and is slidably mounted within housing 65.

A flexible member 70 (for example, a piece of roller chain) is attached as at 72 to an upwardly extending portion 73 of a pin 74 which mounts the second tool arm 34 to shaft 24. Pin 74 is on axis 36. The flexible member 70 extends through a provided opening in base 64 and through the center of spring 66. A threaded screw 75 is fixedly attached to the free end of the flexible member 70 and extends through a provided aperture in cap 67. A nut 76, which can be hand manipulated, is threadably mounted onto the outwardly extending end of screw 75 and abuts against an outer end wall 77 of the cap 67. By adjusting the nut 76 a force can be exerted on the screw 75 and through flexible link or member 70 to pin 74. This in turn causes a moment to be exerted on shaft 24 about its axis and thereby counter balances the weight acting on the arms 33, 34 and 35.

By adjusting the two routers 53 and 54 to cut at the same depth and also adjusting the tracer or stylus end portion 52 to be at the same depth as the routers, three dimensional carvings can be made on identical pieces. As can be seen the tool arms 33, 34 and 35 and their attached tracer and routers are movable about the axis of shaft 24 in directions as indicated by double arrow 78. Further, the arms will move about their axes 36, 37 and 38 in directions as indicated by double arrows 80, 81 and 82. These two movements are in addition to the movement of the motor yoke which will carry the complete assembly in direction as indicated by arrow 21.

Thus, when a carving is to be made, a pattern 83 is mounted onto work table 14 and positioned below the tracing needle or head 50. Unfinished workpieces 84 are mounted below each of the routers 53 and 54. The routers will remove material from the workpieces 84, 84 in accordance with the movements of the tracing needle. If the needle goes up over a raise in the pattern the routers will also be raised through the arms and cross shaft 24. If the needle is moved from side to side the parallel linkage of the unit will cause the routers to move from side to side. Back and forward movement is accomplished by movement of the motor yoke along its provided track and auxiliary arm 16. Any combination of movement in the three directions will occur.

Thus it can be seen that the routers are free to move in three different directions and a three-dimensional carving can be duplicated from a given pattern. The advantages to the home craftsman are immediately apparent. The craftsman can make a pattern from an easily moldable material, if desired, and then transfer the molding or plaque configuration to a hardwood workpiece, resulting in a very beautiful, intricate wooden carving.

The accomplishment of these objectives has heretofore been denied the home craftsman because of the exceedingly high cost of carving machines. By making an adapter which will go onto a home work shop radial arm saw, the carving attachment is made available to the home craftsman.

It is apparent that if desired only one router can be used. In most instances in the home workshop only one router would be used but, if desired, also, as shown, two routers can be used to make duplicate carvings simultaneously.

The unit is easy to manufacture, very easy to mount and adapt for use on a radial arm saw, and is designed to utilize conventional hand held power routers which has self-contained motors and drive shafts.

What is claimed is:

1. The combination with a radial arm saw stand having a generally upright main support column, a work table mounted with respect to said main support column, an arm mounted on said column and extending outwardly therefrom, a motor mounting member, means for mounting said motor mounting member on said arm for movement along a generally horizontal track, said motor mounting member having at least one downwardly depending leg and a work table positioned below said leg of said motor mounting member, of: a cross shaft mounted at the lower end of said motor mounting member leg for movement about a pivotal axis positioned at substantially right angles to the direction of movement of said motor mounting member on said arm, at least a pair of tool arms pivotally mounted on said cross shaft and extending outwardly therefrom, said tool arms being mounted about axes extending at right angles to the axis of said shaft, a cross bar pivotally mounted to each of said tool arms adjacent the outer ends thereof and of size to hold said tool arms substantially parallel to each other, tracing means including an element extending downwardly below a first of said tool arms at an outer end thereof, a power driven cutting tool comprised as a power router having a rotating wood cutting element thereon, an adjustable band attached to the outer end of a second tool arm and encircling the power cutting tool to thereby releasably mount said power cutting tool to the outer end of said second tool arm, and means on said work table of said saw stand for holding a pattern beneath said tracing element and a separate workpiece beneath said power driven cutting tool, said tracing element being movable in three directions over the contour of said pattern and resulting in substantially the same contour to be cut in said workpiece.

2. The combination with a radial arm saw stand having a generally upright main support column, a work table mounted with respect to said main support column, an arm mounted on said column and extending outwardly therefrom, a motor mounting member, means for mounting said motor mounting member on said arm for movement along a generally horizontal track, said motor mounting member having at least one downwardly depending leg and a work table positioned below said leg of said motor mounting, of: a cross shaft mounted at the lower end of said motor mounting member leg for movement about a pivotal axis positioned at substantially right angles to the direction of movement of said motor mounting member on said arm, said cross shaft having at least two flattened portions, at least a pair of tool arms pivotally mounted on said cross shaft and extending outwardly therefrom, said tool arms each having a pair of ears that fit over one of the flattened portions and each arm being pivotally mounted to the flattened portions about axes extending at right angles to the axis of said shaft, a cross bar pivotally mounted to each of said tool arms adjacent the outer ends thereof and of size to hold said tool arms substantially parallel to each other, tracing means including an element extending downwardly below a first of said tool arms at an outer end thereof, a power driven cutting tool releasably mounted at the outer end of a second of said tool arms, and means on said work table of said saw stand for holding a pattern beneath said tracing element and a separate workpiece beneath said power driven cutting tool, said tracing element being movable in three directions over the contour of said pattern and resulting in substantially the same contour to be cut in said workpiece.

3. The combination as specified in claim 2 wherein said tool arms are pivotally mounted to said cross shaft with pins extending through said ears and shaft, one of said pins having an upwardly extending end portion, a spring mounted on said motor mounting means of said saw and hand adjustable linkage means connecting the upper portion of the pins and the spring in a manner so that a moment is exerted about the axis of cross shaft tending to lift the outer ends of the tool arms.

References Cited by the Examiner

UNITED STATES PATENTS

| | | |
|---|---|---|
| 1,313,543 | 8/19 | Keller. |
| 2,185,011 | 12/39 | Anderson. |
| 2,598,251 | 5/52 | Gesner. |
| 2,933,985 | 4/60 | Zwick et al. |

WILLIAM W. DYER, Jr., *Primary Examiner.*

LEON PEAR, *Examiner.*